US008611643B2

(12) United States Patent
Ofek et al.

(10) Patent No.: US 8,611,643 B2
(45) Date of Patent: Dec. 17, 2013

(54) SPATIALLY REGISTERING USER PHOTOGRAPHS

(75) Inventors: Eyal Ofek, Redmond, WA (US); Dan Hou, Seattle, WA (US); Blaise Aguera y Arcas, Redmond, WA (US); Scott Vernon Fynn, Seattle, WA (US); Roberto R. Molinari, Bellevue, WA (US); Michael Kroepfl, Bellevue, WA (US); Tony Ernst, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/618,351

(22) Filed: Sep. 14, 2012

(65) Prior Publication Data

US 2013/0009954 A1 Jan. 10, 2013

Related U.S. Application Data

(63) Continuation of application No. 12/783,598, filed on May 20, 2010, now Pat. No. 8,295,589.

(51) Int. Cl.
*G06K 9/00* (2006.01)
*G06K 9/32* (2006.01)

(52) U.S. Cl.
USPC ........... 382/154; 382/294; 382/296; 382/297; 382/298

(58) Field of Classification Search
USPC ................................. 382/154, 294, 296–298
See application file for complete search history.

(56) References Cited

U.S. PATENT DOCUMENTS

| 6,324,469 | B1 | 11/2001 | Okude et al. |
| 6,434,265 | B1 * | 8/2002 | Xiong et al. ................. 382/154 |
| 6,571,024 | B1 | 5/2003 | Sawhney et al. |
| 7,148,892 | B2 | 12/2006 | Robertson et al. |

(Continued)

FOREIGN PATENT DOCUMENTS

WO    2009089125 A2    7/2009

OTHER PUBLICATIONS

Kang et al., "Smooth Scene Transition for Virtual Tour on the World Wide Web," IEEE Computer Society, Aug. 16-18, 2005, http://ieeexplore.ieee.org/stamp/stamp.jsp?arnumber=1540728&isnumber=32901.

(Continued)

*Primary Examiner* — Uptal Shah
(74) *Attorney, Agent, or Firm* — Microsoft Corporation

(57) ABSTRACT

Photographs of an object may be oriented with respect to both the geographic location and orientation of the object by registering a 3D model derived from a plurality of photographs of the objects with a 2D image of the object having a known location and orientation. For example, a 3D point cloud of an object created from photographs of the object using a Photosynth™ tool may be aligned with a satellite photograph of the object, where the satellite photograph has location and orientation information. A tool providing scaling and rotation of the 3D model with respect to the 2D image may be used or an automatic alignment may be performed using a function based on object edges filtered at particular angles. Once aligned, data may be recorded that registers camera locations for the plurality of photographs with geographic coordinates of the object, either absolute latitude/longitude or relative to the object.

26 Claims, 15 Drawing Sheets

(56) References Cited

U.S. PATENT DOCUMENTS

| | | | |
|---|---|---|---|
| 7,386,394 | B2 | 6/2008 | Shulman |
| 7,612,773 | B2* | 11/2009 | Magnin et al. ............... 345/419 |
| 8,184,129 | B2* | 5/2012 | Shekhar et al. ............... 345/648 |
| 2005/0089213 | A1* | 4/2005 | Geng ............................ 382/154 |
| 2006/0140473 | A1* | 6/2006 | Brooksby et al. ............. 382/154 |
| 2007/0258642 | A1 | 11/2007 | Thota |
| 2008/0246759 | A1 | 10/2008 | Summers |
| 2008/0291217 | A1 | 11/2008 | Vincent et al. |
| 2009/0002394 | A1 | 1/2009 | Chen et al. |
| 2009/0237510 | A1 | 9/2009 | Chen et al. |
| 2010/0166294 | A1* | 7/2010 | Marrion et al. ............... 382/154 |
| 2011/0282578 | A1* | 11/2011 | Miksa et al. .................. 701/208 |

OTHER PUBLICATIONS

Saudarsanam et al., "Non-linear Perspective Widgets for Creating Multiple-View Images," 2008, http://www.cs.wustl.edu/-cmq/content/papers/npar2008np/npar2008np.pdf.

Vincent, L., "Taking Online Maps Down to Street Level," Google Inc., Dec. 2007, http:i/www.vincentnet.com/07ieeecomputer streetview web.pdf.

"Google 3D Warehouse Adds Street View," Apr. 10, 2008, http://www.ditii.com/2008/04/10/google-3dwarehouse-adds-street-view/.

"Live Search Maps," Microsoft Corporation, Dec. 2006, http://www.microsoft.com/presspass/download/newsroom/msn/wllocalrg .doc.

Kaminsky et al., "Alignment of 3D Point Clouds to Overhead Images.", 2009.

* cited by examiner

Overhead view

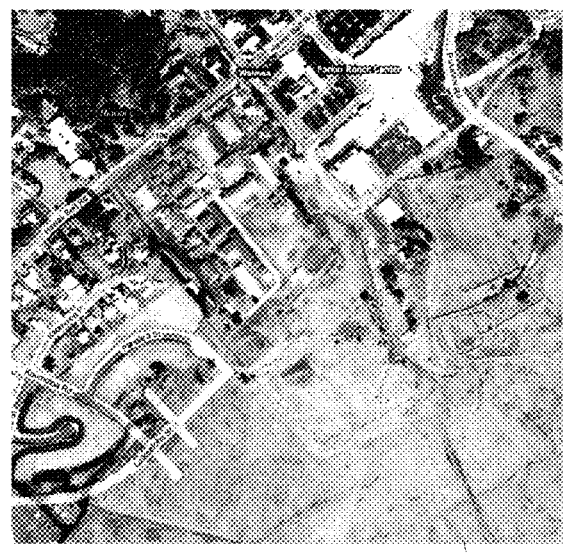
Fig. 21 — 1808
Fig. 22 — 1808
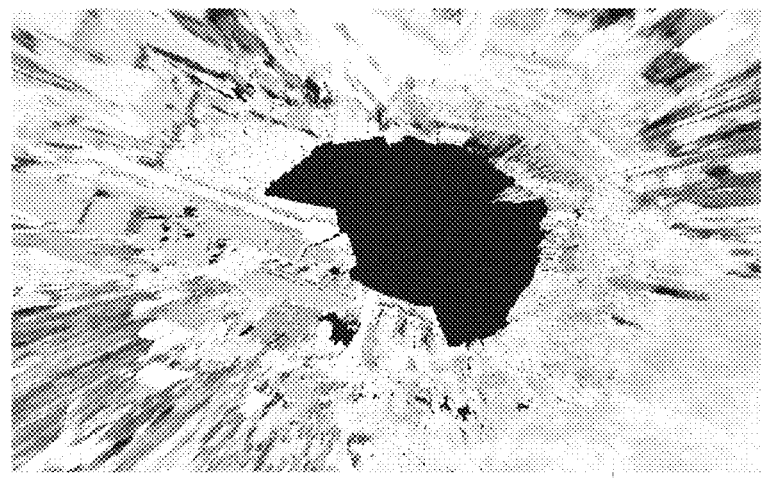
Fig. 23 — 1808

SPATIALLY REGISTERING USER PHOTOGRAPHS

CROSS-REFERENCE TO RELATED APPLICATION(S)

This application is a continuation application of U.S. application Ser. No. 12/783,598, filed on May 20, 2010, the disclosure of which is incorporated herein by reference in its entirety.

BACKGROUND

The expanded use of Internet-based maps incorporating street level views, aerial photography, and satellite images has expanded the ability of users to connect to the world around them.

However, changing elevations from, for example, a satellite view to a street-level view, particularly a user's street-level photograph of an object, can leave a viewer disoriented with respect to the orientation of the object.

Publicly available products, such as Photosynth™, allow users to create three dimensional (3D) point clouds, or models, of an object from photographs of the object, such as landmarks, statues, buildings, etc. However, the 3D point clouds that are created are not registered to either the location of the object or their orientation with respect to the actual object.

SUMMARY

Various tools and techniques can be applied to orienting a 3D point cloud or 3D model representation of objects with respect to their absolute orientations. Once oriented, the camera locations of the point cloud's associated photographs may be correctly oriented with respect to the physical geography of the object. For example, in one embodiment, a tool allows scaling and rotating a top view of a 3D point cloud over a satellite or other overhead view of the actual object.

In another embodiment, a complex aerial or satellite scene may be reduced to orthogonal or other fixed angle components to allow more accurate automatic matching of point clouds to the physical space represented by the point cloud.

In yet another embodiment, where terrain or building features are indistinct, colors may be matched to allow correct orientation and scaling of a 3D point cloud to an actual geographic area or other physical object.

When applied, the registered 3D point clouds or models may be used for reconstruction or restoration of a structure, where the registration of the model to the actual site can assist in both the planning and accurate completion of the project. In another case, registration of the camera locations to actual earth coordinates may allow further analysis of the photographs for season or time of day using visual information in the photographs. In a similar application, registration of multiple 3D point clouds allow accurate before and after comparison of objects over time through the selection of photographs having similar camera locations, for example, a scene or object before and after a natural disaster.

In an embodiment where the photographs do not clearly convey a connection of the object to the ground, for example, a skyward view of a building, matching a point cloud of the building to a perspective view of the building may allow registration of the building to a ground elevation.

BRIEF DESCRIPTION OF THE DRAWINGS

FIG. 21 is a top view of a scene;

FIG. 22 is a top view of a point cloud of the scene of FIG. 21;

FIG. 23 is a simulated top view of the scene of FIG. 21;

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
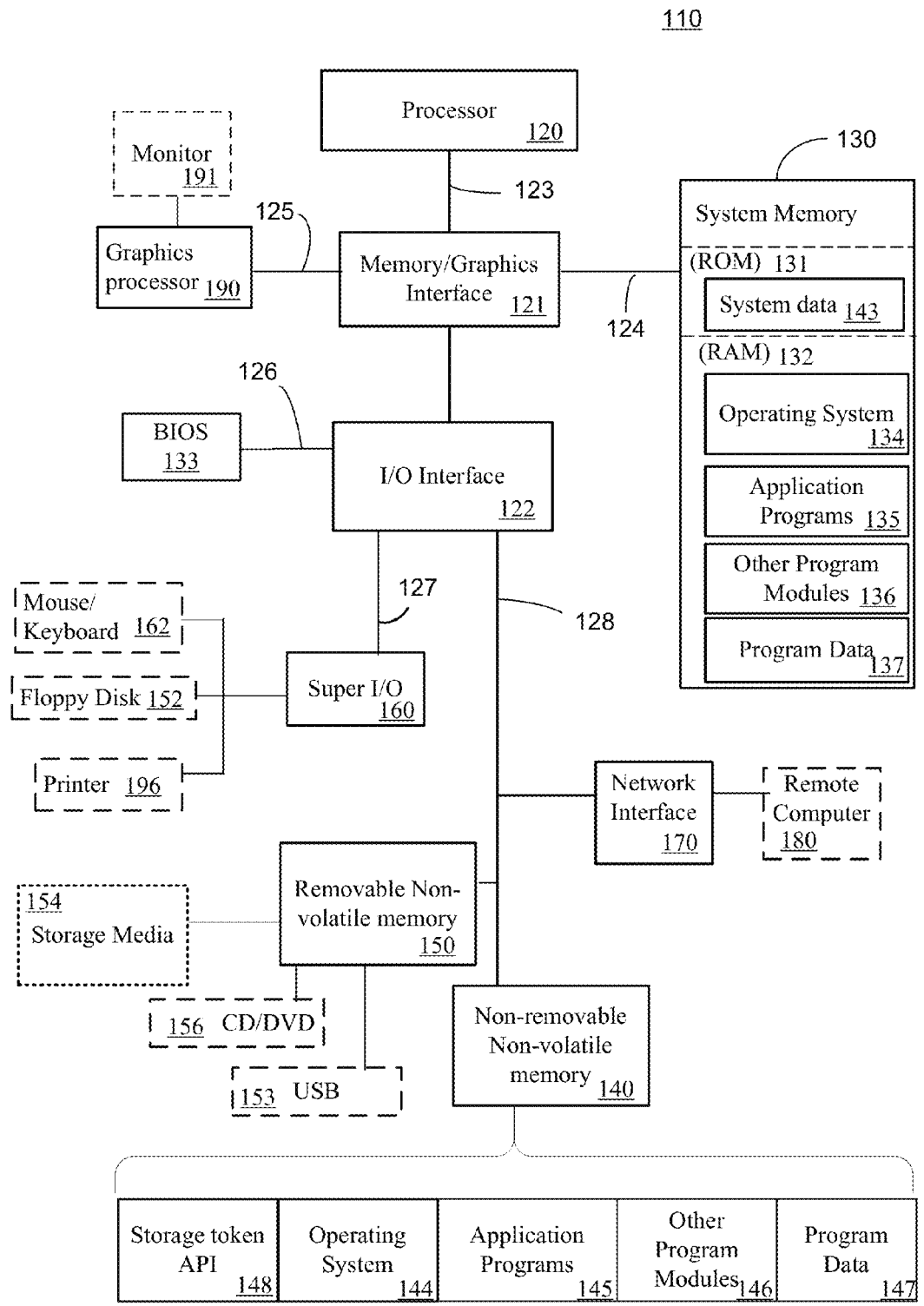
FIG. 1 is a block diagram of a computer suitable for implementing some or all of the claimed methods.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
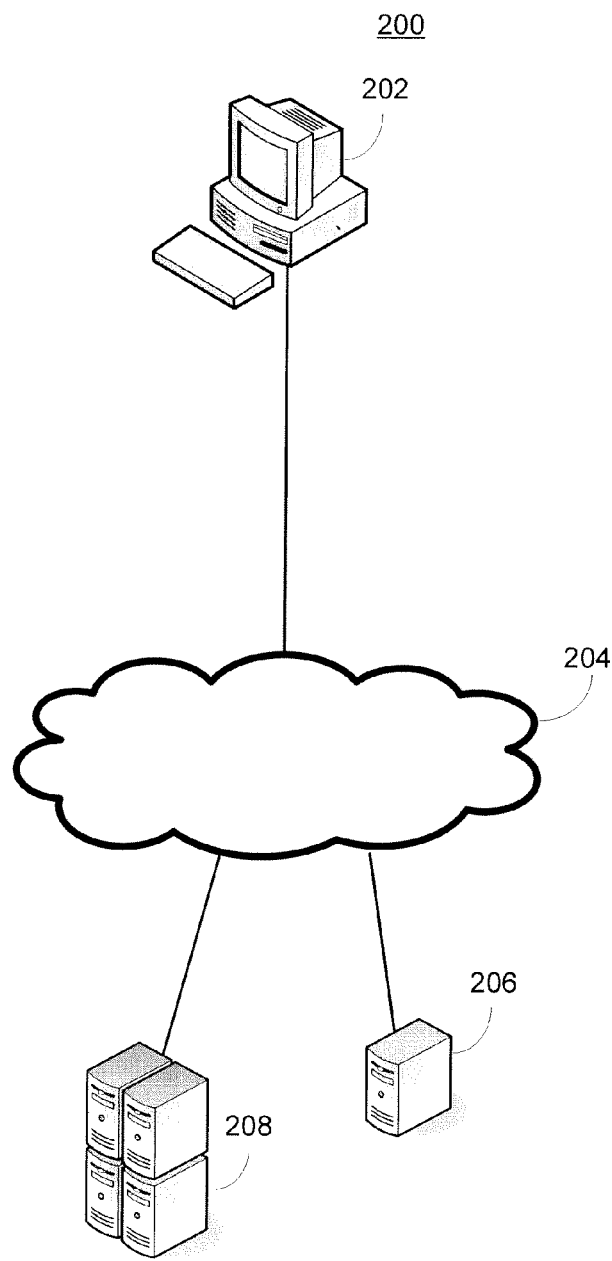
FIG. 2 is a block diagram illustrating a hardware architecture.

FIG. 2 illustrates one possible embodiment of a hardware architecture that supports spatially registering user photographs. Of course, other arrangements are possible, including implementation on a single computer or the use of other networking types and configurations, such as local or wide-area wireless networks (not depicted). A computer 202 may be coupled by a network 204 to one or more servers, such as a web server 206 and a server farm 208.

A user may collect a series of photographs of an object, such as a statue, a landmark, a street scene, a nature feature, etc. The photographs may be taken using a digital camera and transferred to the computer 202 and uploaded via the network 204 to the web server 206 for processing on the server farm 208. In other embodiments, the device taking the pictures may be capable of directly uploading the pictures to either the Web server 206 or the server farm 208, such as by a smart phone with camera and network connection (not depicted).

The Web server 206 and the server farm 208 may, together or separately, create an association between the photographs using the Photosynth™ process. In another embodiment, the Photosynth data may be generated at a local user computer. This process matches like points from separate photographs and places these points in 3-D space, creating a three-dimensional point cloud. Another output of the Photosynth™ process is an extrapolation of the location of the camera for each respective photograph used in the process. The Photosynth process is documented in pending U.S. patent application Ser. No. 11/493,436, filed Jul. 25, 2006, which is hereby incorporated by reference for all purposes.

Figure 3:
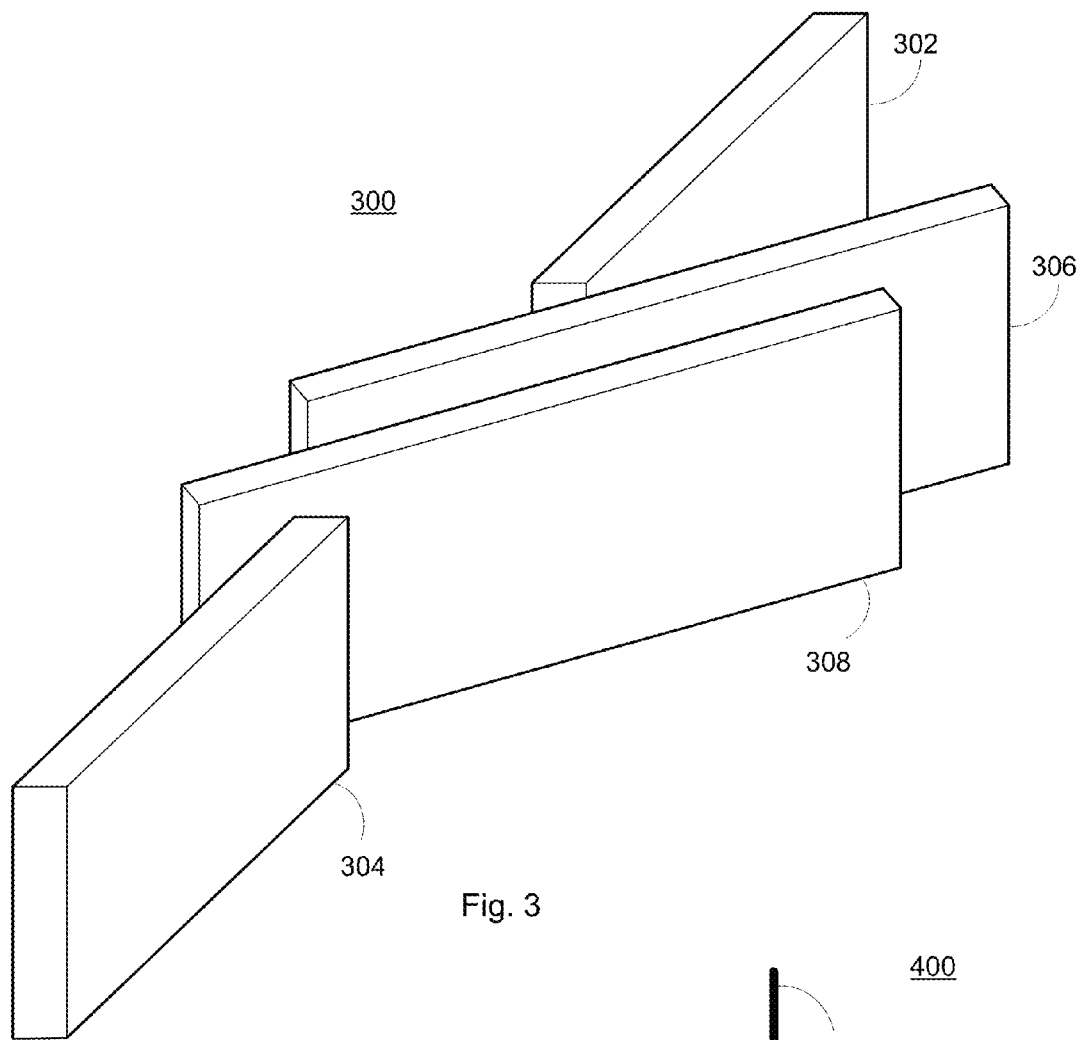
FIG. 3 is a perspective view of an object.

FIG. 3 illustrates an object 300, shown a perspective view of a series of walls 302 and 304 which are co-linear, and two other walls 306 and 308 which are generally parallel and between the two co-linear walls 302 and 304. The walls 300 may be an art object or may be architectural ruins, etc.

Figure 4:
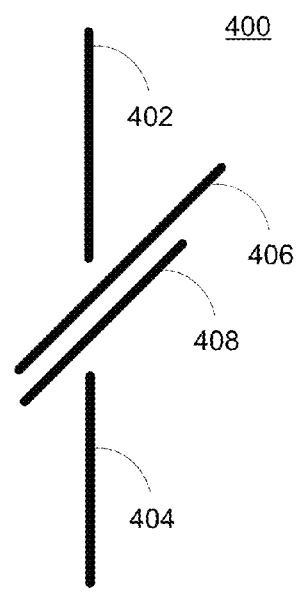
FIG. 4 is an overhead view of the object of FIG. 3.

FIG. 4 illustrates an overhead view of an object 400, which may correspond to the walls 300 of FIG. 3. The overhead view 400 may include walls 402 and 404 which are generally co-linear and walls 406 and 408 which are generally parallel and between the co-linear walls 402 and 404.

Figure 5:
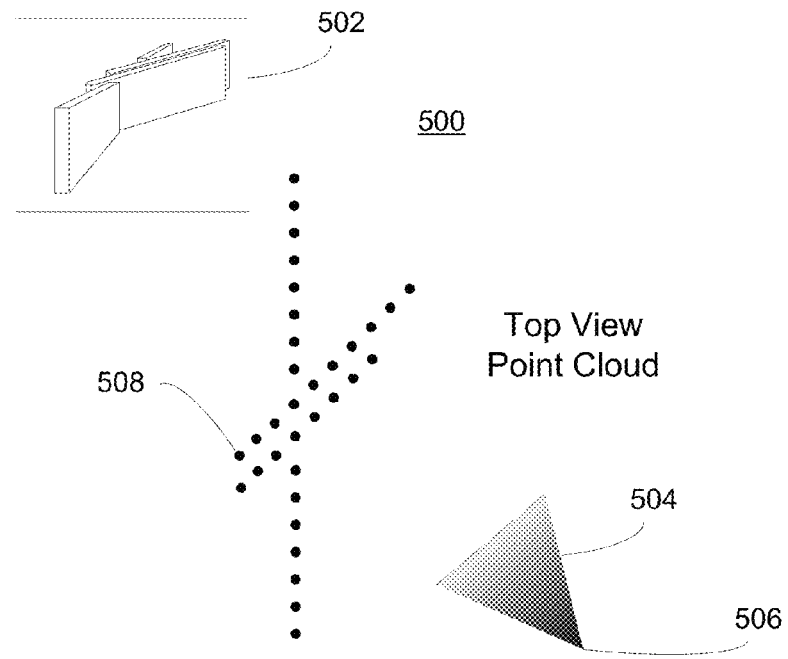
FIG. 5 is illustrates a top view of a point cloud of the object of FIG. 4.

FIG. 5 illustrates a top view of a point cloud 500 of the object 400 of FIG. 4. The point cloud may be a three dimensional representation of the object that is generated from a plurality of photographs taken of the object 400. As few as a handful of photographs or as many as hundreds of photographs may be used to generate the 3D representation of the object. A representative one 502 of the plurality of photographs of the object is depicted, with its associated camera frusta 504, showing a calculated camera position 506 at the 'point' of the camera frusta 504. Each photograph used to generate the 3D representation of the object has a corresponding camera location calculated relative to the 3D representation as part of the point cloud synthesis process. The top view may show individual points, e.g., point 508 at different actual elevations, or may represent the actual top points of the object 400.

Figure 6:
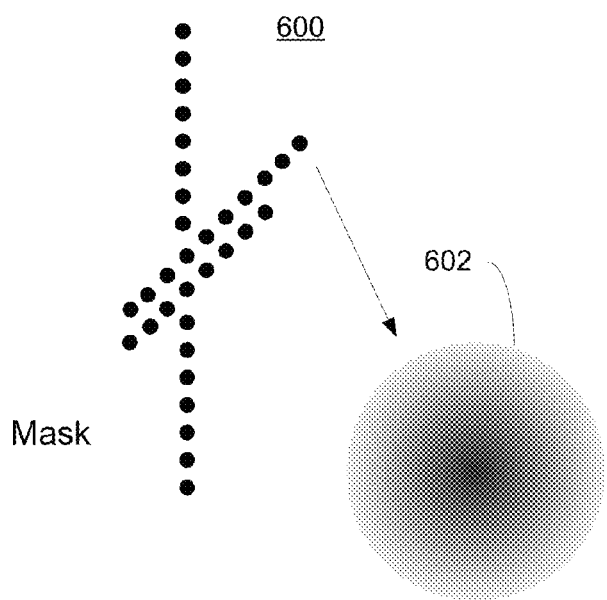
FIG. 6 is illustrates a mask related to the point cloud of FIG. 5.

FIG. 6 illustrates a mask 600 that may be generated for use in spatially registering user photographs. For each point in the top view of the point cloud 500 of FIG. 5, a corresponding point may be generated. Each point in the mask 600 may be larger than its corresponding point in the top view of the point cloud 500. A close-up view 602 of a representative point shows that each point in the mask may be more darkly shaded in the middle and more lightly shaded at the edge to improve readability of an underlying image, but to help maintain the desired contrast. Other embodiments may use a solid shaded mask. The use of the mask 600 is discussed below with respect to FIG. 7.

Figure 7:
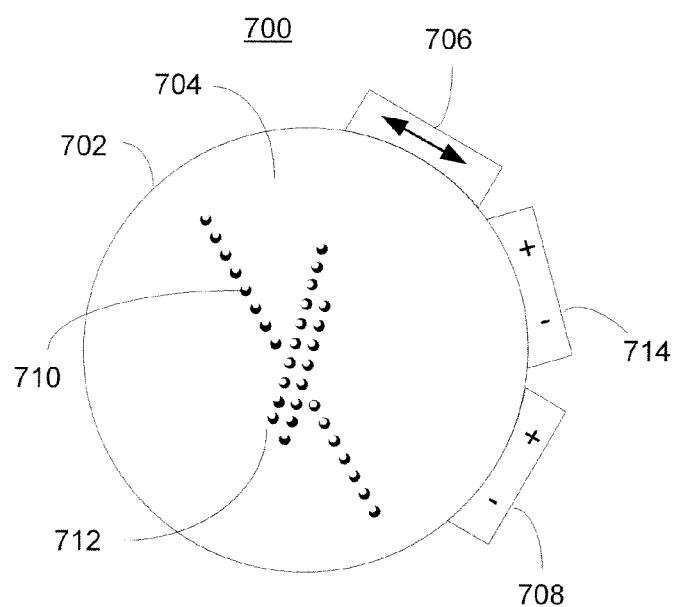
FIG. 7 illustrates a manual registration tool.

FIG. 7 illustrates a tool 700 that may be used for manually registering a point cloud 500 with an actual view of an object 400. The tool 700 may include a view area 702 with an interior portion 704. The interior portion 704 may be shaded to provide contrast when used over an actual overhead view, such as a satellite photograph. The interior portion 704 may be used to display a top view point cloud 710, similar to the top view point cloud 500 of FIG. 5. The individual points of the top view point cloud 710 may be similarly colored as an underlying image (not depicted) because the point cloud is derived from the same physical object being registered. In one embodiment, the actual colors from the user photographs are used to color the individual points of the top view point cloud 710. In order to provide a more visible representation of the top view point cloud 710, a mask 712, such as the mask 600 illustrated in FIG. 6, may be used. The top view point cloud 710 may be aligned over the mask 712, and the colors of the top view point cloud 710 may be inverted with respect to the mask point colors. That is, when a mask 712 is used, the process may evaluate the mask color and make any adjustments to the point cloud colors to allow better visibility of the points against the mask. Thus, the actual size of the individual points of the top view point cloud 710 may be maintained, but may still be shown in high relief to the underlying image.

The tool 700 may include one or more controls. For example, the tool 700 may include a rotation control 706 that rotates the entire tool 700 including the point cloud 710 and mask 712. The tool 700 may also include a zoom control 708 that allows the point cloud 710 and mask 712 to be enlarged or reduced with respect to the background image. A resizing control 714 may allow changing the size of the view area 702 while maintaining the size of the point cloud 710 and mask 712 with respect to the background image. For the sake of clarity, the resizing control 714 is not depicted in later drawings, but may be present in practice.

Figure 8:
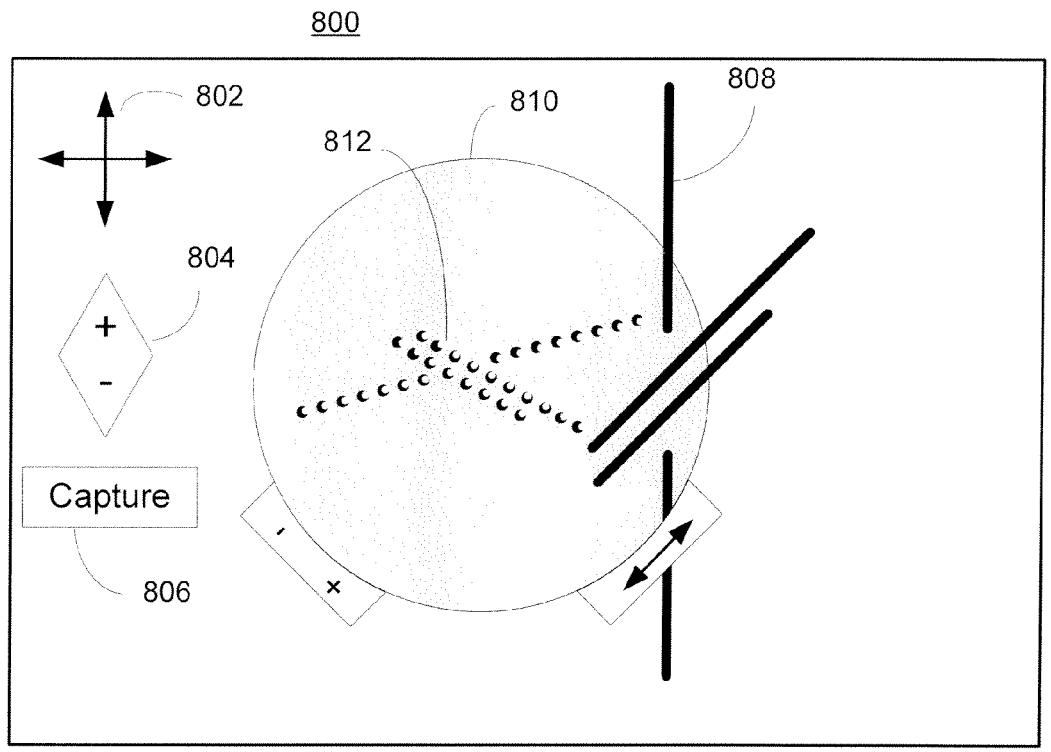
FIG. 8 is an illustration of a screen shot showing an aspect of spatially registering user photographs.

FIG. 8 illustrates an exemplary window 800, or partial computer screen shot, illustrating one facet of spatially registering user photographs. A base image may be displayed in the window. The base image may be a map, an aerial view, a satellite photograph, etc. For the sake of clarity, only one feature in the base image is displayed. The window 800 may include a movement control 802 that allows movement of the base image. Other methods of moving the base image may be used, separately or in combination with the movement control 802, such as, but not limited to, a grab and drag construct using a mouse, or horizontal and vertical scroll bars (not depicted). A zoom control 804 may allow increasing or decreasing the size of the base image relative to the window 800. A capture button 806 may be used to indicate that the registration of the user photographs is complete. Walls 808, such as the walls illustrated in FIG. 3 or 4 are shown in a top view as the only displayed elements of the base image. In one embodiment, the base image is always displayed in a fixed orientation. For example, in a geographic environment, the top of the window 800 may always be north. However, this may not always be the case.

In some embodiments other elements of the base image may be visible, such as other natural and man-made features in a satellite photograph. However, a filtering process to remove unwanted clutter may also be applied to leave only the most significant features. Such filtering may involve color filtering, edge discrimination, etc.

Also illustrated in FIG. 8 is a tool 810 used in the alignment process. The tool 810 may show a top view point cloud and mask 812 depicting the top view of the 3D model generated from the user photographs, as discussed above with respect to FIGS. 5-7. As shown in FIG. 8, the top view point cloud and mask 812 are both askew and out of scale with the walls 808 of the base image.

Figure 9:
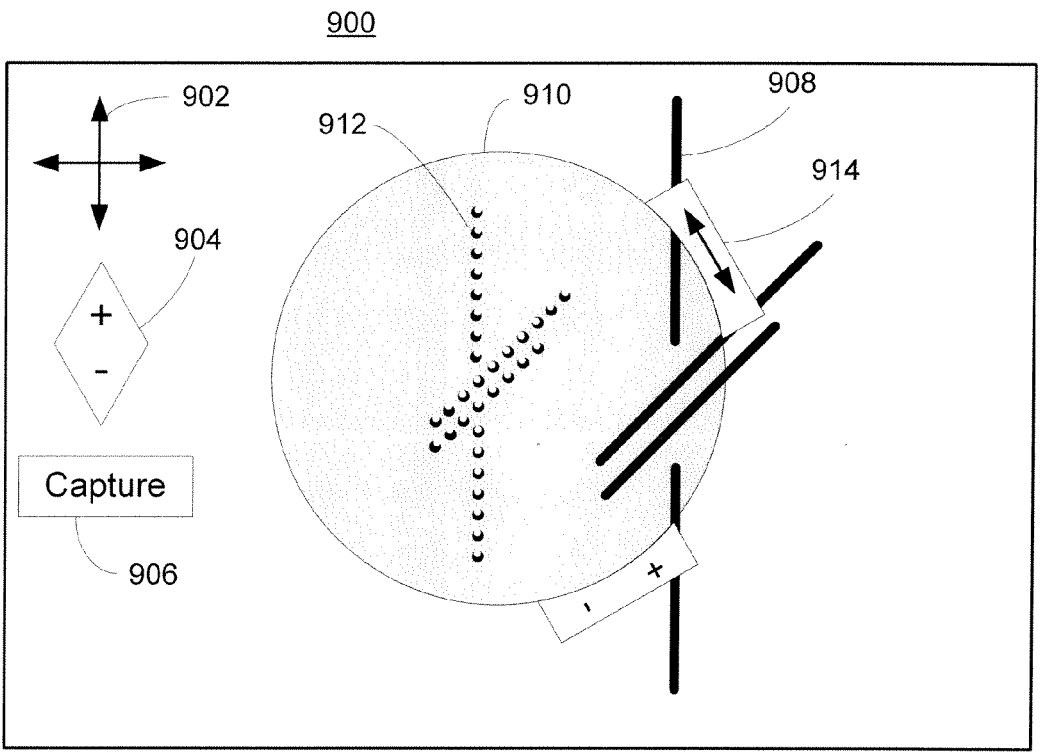
FIG. 9 is an illustration of another screen shot showing an aspect of spatially registering user photographs.

FIG. 9 illustrates a window 900 that may be a second view of the window of FIG. 8, after some processing has taken place. The window 900 includes a movement control 902, a zoom control 904, and a capture button 906. The walls 908 are present as at least a portion of a base image. The tool 910 illustrates the top view point cloud and mask 912. In this figure, the rotation control 914 has been activated to rotate the top view point cloud and mask 912 into the correct orientation with the walls 908. However, the walls 908 and top view point cloud and mask 912 are still displaced and out of scale.

Figure 10:
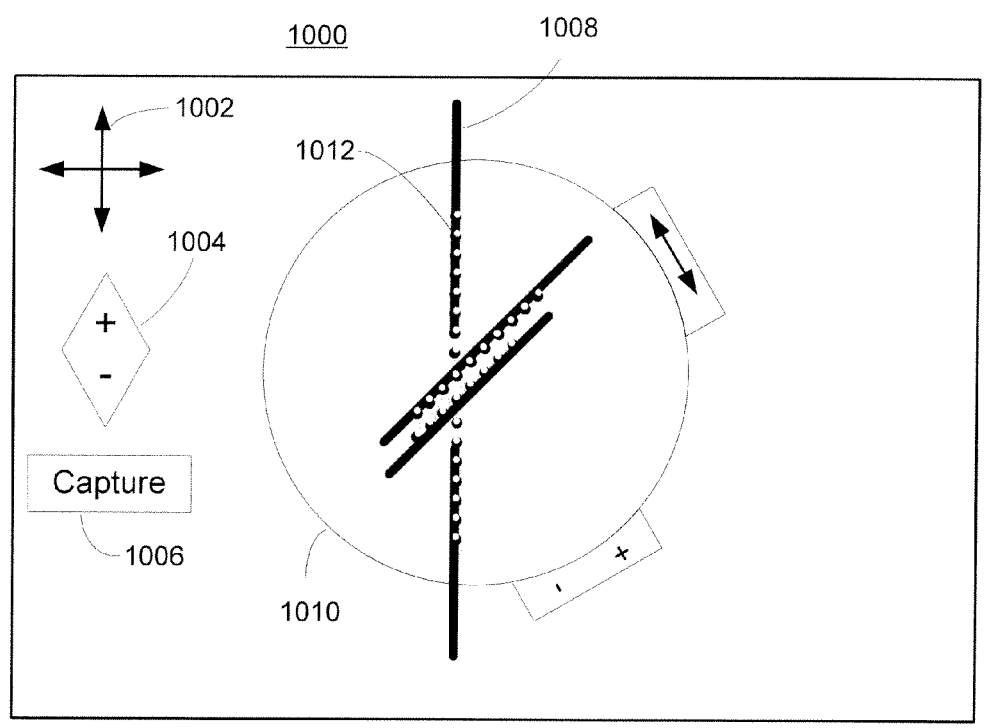
FIG. 10 is an illustration of yet another screen shot showing an aspect of spatially registering user photographs.

FIG. 10 illustrates a window 1000 with a movement control 1002, a zoom control 1004, a capture button 1006, and a tool 1010, similar to the window 900 of FIG. 9. In FIG. 10, walls 1008 are shown aligned with a top view point cloud and mask 1012. In operation, the movement tool 1002 may have been utilized to move the base image, including the walls 1008, into alignment with the top view point cloud and mask 1012.

Figure 11:
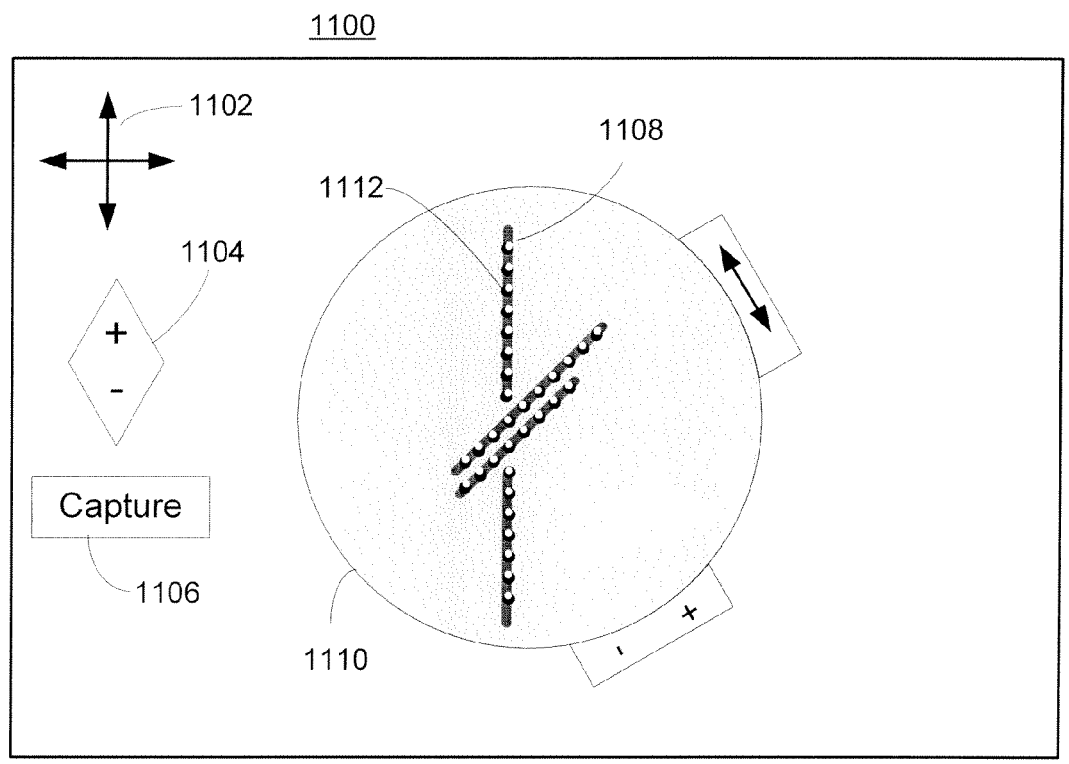
FIG. 11 is an illustration of yet another screen shot showing an aspect of spatially registering user photographs.

FIG. 11 illustrates a window 1100 with a movement control 1102, a zoom control 1104, a capture button 1106, and a tool 1110, similar to the window 1000 of FIG. 10. In FIG. 11, walls 1108 are shown scaled to match in orientation and size with a top view point cloud and mask 1112. In operation, the zoom control 1104 may have been activated to decrease the viewed size of the walls 1108 to effect the match in scale. At this point, the capture button 1106 may be activated to indicate that the registration process is complete and that the geographic coding associated with the base image, i.e. walls 1108 may be further associated with the top view point cloud and mask 1112, particularly the point cloud. With this association in place, the point cloud can be located with absolute latitude and longitude attributes, if available, and may also be given a compass orientation with respect to true north, or whatever the known orientation of the base image may be.

Because the point cloud is generated from a plurality of 2D images from which camera locations can be derived, each of the camera locations may also be located with respect to geographic coordinates and compass angle, if available. Additionally, with the known dimensions of the overhead view, the approximate dimensions of the object represented by the point cloud can be calculated, and correspondingly the scale of the photographs used to generate the point cloud.

Figure 12:
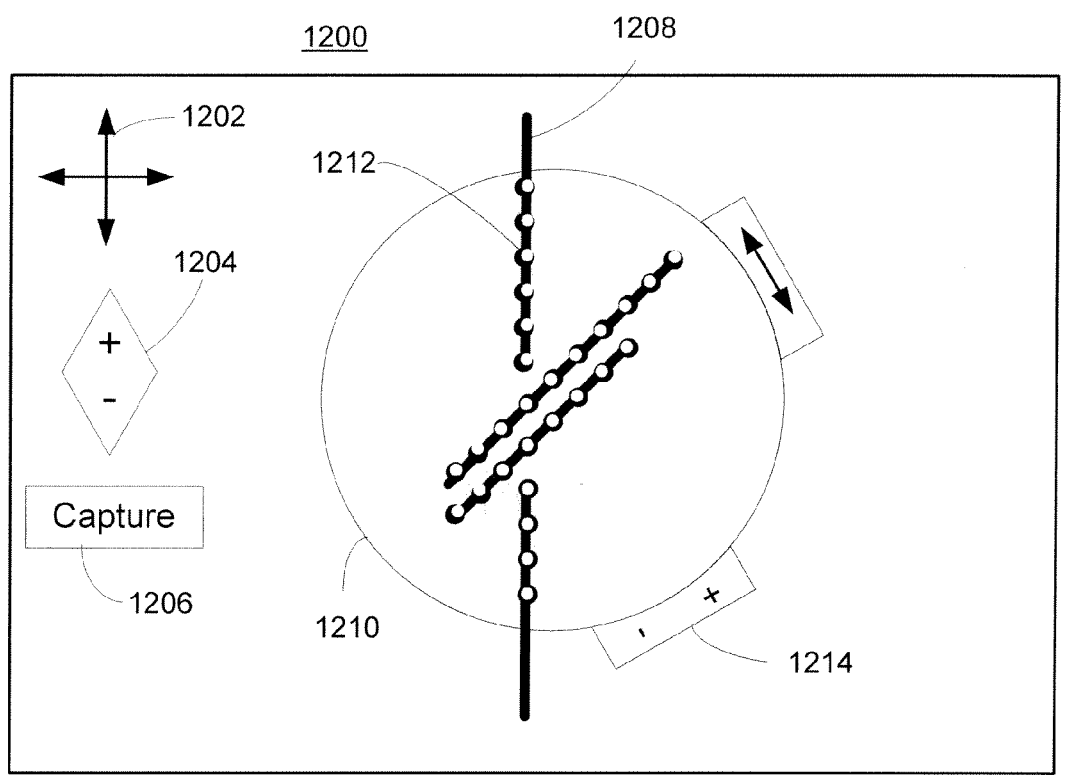
FIG. 12 is an illustration of yet another screen shot showing an aspect of spatially registering user photographs.

FIG. 12 illustrates a window 1200 with a movement control 1202, a zoom control 1204, a capture button 1206, and a tool 1210, similar to the window 1000 of FIG. 10. In FIG. 12, walls 1208 are shown scaled to match in orientation and size with a top view point cloud and mask 1212. In operation, the tool's zoom control 1214 may have been activated to increase the viewed size of the top view point cloud and mask 1212 to effect the match in scale with the walls 1208, even though a portion of the top view point cloud and mask 1212 may run beyond the viewable area of the tool 1210. At this point, the capture button 1206 may be activated to indicate that the registration process is complete and that the geographic coding associated with the base image, i.e. walls 1208 may be further associated with the top view point cloud and mask 1212, particularly the point cloud. With this association in place, the point cloud can be located with absolute latitude and longitude attributes, if available, and may also be given a compass orientation with respect to true north, or whatever the known orientation of the base image may be. Because the point cloud is generated from a plurality of 2D images from which camera locations can be derived, each of the camera locations may also be located with respect to geographic coordinates and compass angle, if available.

Figure 13:
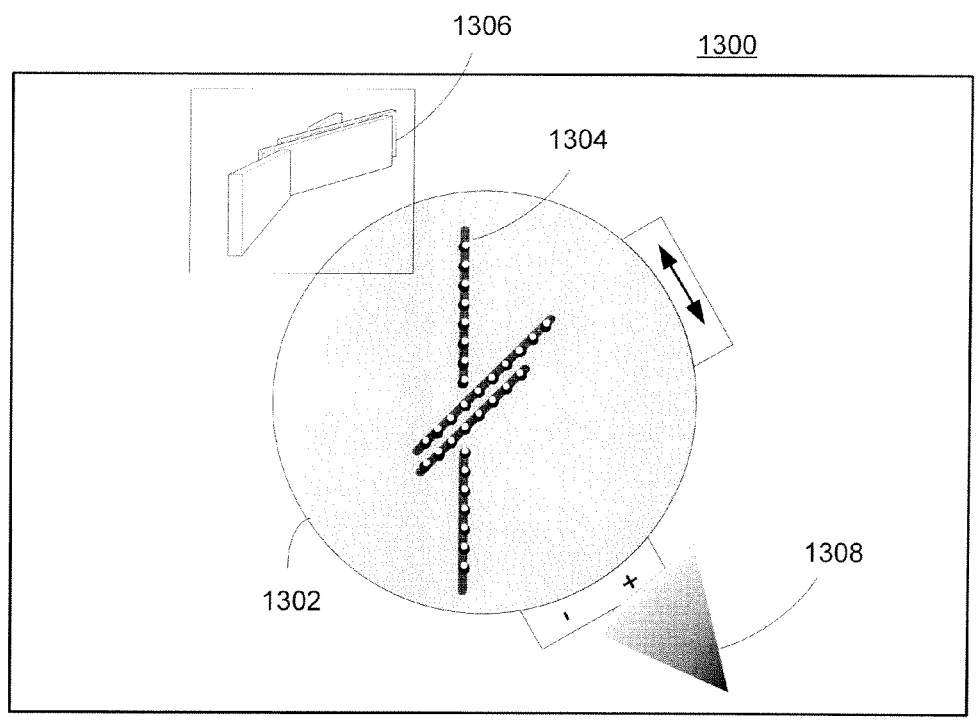
FIG. 13 is an illustration of a screen shot showing a photograph and related camera frusta.

FIG. 13 illustrates a window 1300 similar to the windows of FIGS. 10-12. The window controls of the previous figures are not shown for the sake of clarity. FIG. 13 illustrates a feature that may be activated to help in the registration process. The tool 1302 may show the top view point cloud and mask 1304, with or without a base image. One of the photographs 1306 used in the construction of the point cloud may displayed along with the camera frusta 1308 showing the location and direction of the camera relative to the top view point cloud and mask 1304. The photograph 1306 is oriented in line with the camera frusta 1308 and top view point cloud and mask 1304. In one embodiment, movement of the cursor around the window 1300 will display similar camera frusta and corresponding photographs to help a user align and orient objects. This feature may be particularly useful when objects being aligned have less distinct characteristics, for example, a beach scene composed mostly of water and sand.

Figure 14:
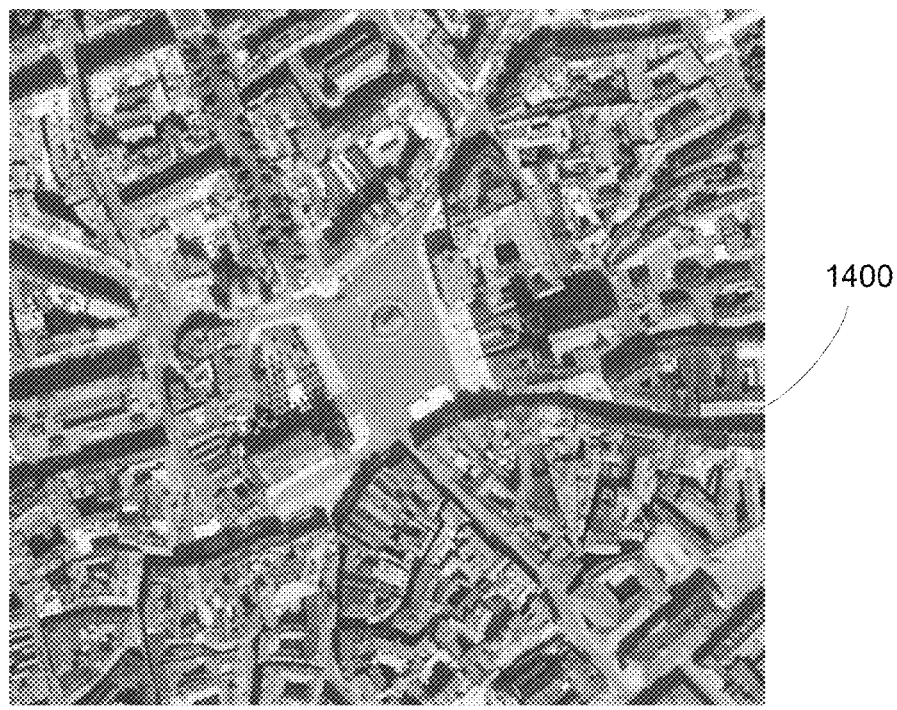
FIG. 14 is view of a dense urban environment.
Figure 15:
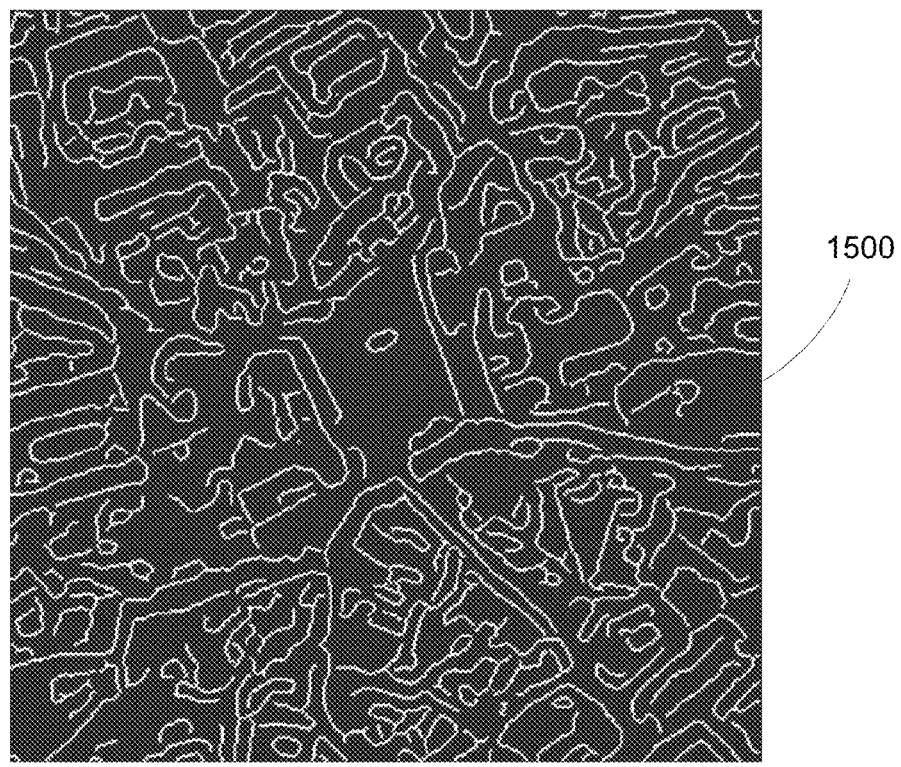
FIG. 15 is an edge map derived from the view of FIG. 14.
Figure 16:
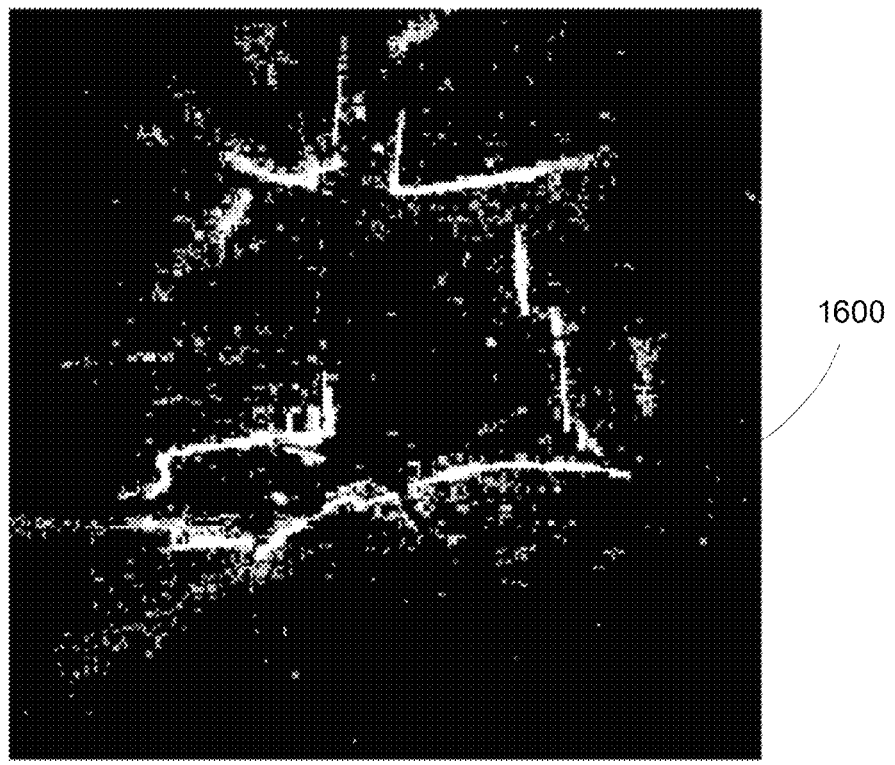
FIG. 16 is a top view of a point cloud of the scene of FIG. 14.
Figure 17:
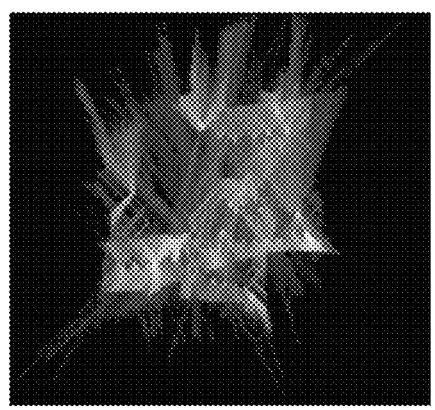
FIG. 17 is a prior art representation of viewing rays between camera locations using the Kaminsky method.

FIGS. 14-18 depict different views of a dense urban environment and will be used to illustrate a technique for automatically matching 3D point clouds to overhead images. FIG. 14 shows an overhead view 1400 of a city. FIG. 15 shows an edge map 1500 of the overhead view 1400. The edge map 1500 may be generated using know techniques to distinguish boundaries between objects using color and shading. FIG. 16 illustrates a top view point cloud 1600 of the same scene.

A prior art technique for spatially registering user photographs is described in a paper "Alignment of 3D Point Clouds to Overhead Images," by Kaminsky, et al. The Kaminsky prior art method uses a notion that points in a cloud correspond to points in a scene, around the image edges. To correlate between the position of the points and edges in the top view, the Kaminsky method adds a score to each cloud point that falls on an edge in the top view. Kaminsky also assumes that there should be less edges in the top view where there are no cloud features. They model the areas that do not include features as open space, where each open space area is defined by rays from each camera location to each feature in the scene, as viewed from that camera. A cost is assigned to each map edge that falls in the open space. A ray trace of the open space for the overhead view 1400 of FIG. 14 is shown in prior art FIG. 17. A score for a trial match of a given scale and rotated point cloud to the overhead view is calculated as a value for all edges that match minus a value for all edges that lie in an 'open space.' The score is regenerated for a number of x-y translation, scale, and rotation combinations. The combination with the highest score is selected.

Figure 18:
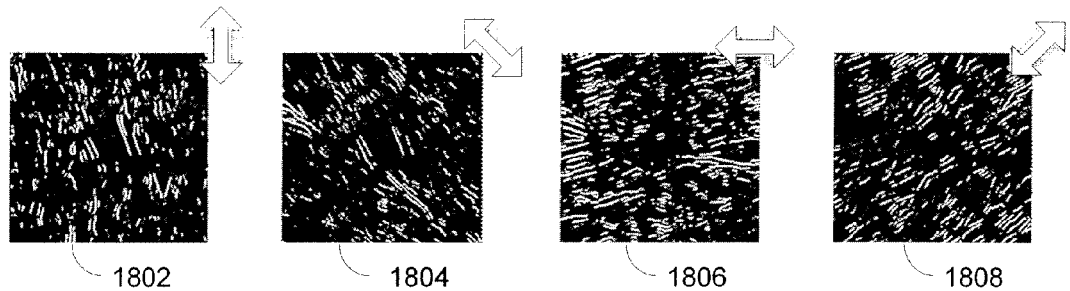
FIG. 18 shows four filtered representations of the edge map of FIG. 15.

A different technique may be used to provide improved calculation speed and matching results. In analyzing Kaminsky, one area where errors may be introduced is the contribution of edges lying in another direction to an actual edge. For example, a north-south wall may have points that appear to be points on a nearby east-west wall. To address this, the edge map 1500 may be filtered into a series of edge maps, where only edges lying in similar directions are kept. FIG. 18 shows four filtered edge maps, a first map 1802 having a generally north-south orientation, a second map 1804 having a generally southeast-northwest orientation, a third map 1806 having a generally east-west orientation, and a fourth map 1808 having a generally southwest-northeast orientation. In one embodiment, as illustrated here, each set of edge pixels (edgels) may be created from edges lying within a span of about 10 degrees of a 45 degree interval from an orientation axis, such as north-south. Depending on the nature of the overhead view, other intervals and spans may be used.

Figure 19:
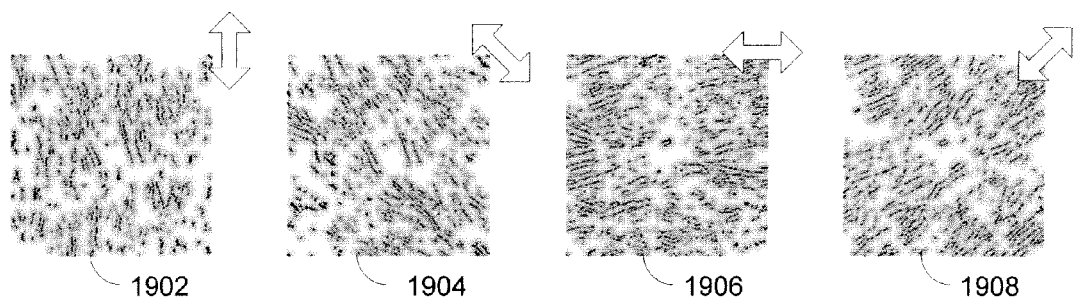
FIG. 19 shows four distance maps developed from the four filtered representations of FIG. 18.

In order to speed computation for the next step, a distance map, or distance image, is created for each pixel. The distance map stores at each pixel the distance to the nearest edgel. This may be performed for each filtered edge map. FIG. 19 illustrates four distance maps 1902, 1904, 1906, and 1908, corresponding to each edge map of FIG. 18, 1802, 1804, 1806, and 1808, respectively. A darker color is indicative of a lower distance value.

The distance maps may be calculated in linear time, that is, with a fixed time for each pixel. Each feature point (that is, each point in the point cloud) can be multiplied by the distance value at the corresponding pixel in a distance map, for example, distance map 1902. Instead of using a time-consuming convolution operation using a sliding window approach, it may be favorable to use Fast Fourier Transform (FFT) to compute the convolution. This can be achieved by transforming both the input image as well as the convolution kernel into the frequency domain using FFT, and then multiplying the two results. The product in frequency domain can then be transformed back using inverse FFT into image domain, the result of which corresponds to the convolution of the input image with the convolution kernel. Especially for large convolution kernels, this process can speed up the operation significantly. The convolution of feature points with edgel distance maps generates a weighted score for each scale, rotation and pixel increment (x-y movement). When compared to the Kaminsky method, up to a two order of magnitude increase in calculation speed is observed as well as improved registration results. In one exemplary embodiment using 10 scales and 180 rotations, the current method returned results in 3.5 minutes vs. 52 minutes for the prior art, even though the current system used one pixel increments vs. the 10 pixel increments of the prior art.

Figure 20:
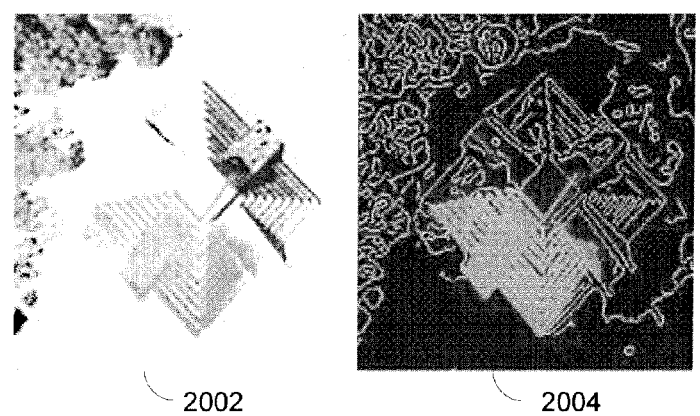
FIG. 20 illustrates an overhead view of a structure and a registration result.

FIG. 20 illustrates an overhead view 2002 of a structure and a registration result 2004 of a point cloud (lighter shades) with an edgel map. The successful alignment illustrates a result from use of the technique discussed immediately above. FIG. 20 illustrates that a successful registration may be accomplished even though photographs, and the resulting point cloud, comprehend only a portion of the object being registered.

In comparison, the Kaminsky method placed the point cloud nearly off the image on the upper right. Automatic alignment of user photographs, and their corresponding point clouds, with real life locations provides an opportunity to provide registration for thousands, or millions, of user photographs already taken and archived. Such a process may be useful for creating time lapse photographic re-creations of objects, before and after comparisons, or even forensic analysis of a scene by, in part, determining absolute camera locations for pictures of an object or scene.

In another embodiment, the manual alignment tool described above may be used to provide a coarse alignment for rotation, scale, and offset and the automated process described above may then be activated to fine tune the alignment. For example, an activation button may be provided so a user of the tool 700 of FIG. 7, can hand off the alignment process when deemed to be close enough. In another embodiment, the capture button, e.g. button 806 of FIG. 8 may be used to activate the automated process. This advantageous combination allows a user to provide the basic alignment but lets the user avoid the detail work associated with the fine adjustments required to select a best fit. In operation, the automated matching program may make assumptions regarding how may steps of scale, rotation and pixel increment over which to perform calculations. For example, a manually located point cloud may be assumed to within 15% of the base image for each of the three adjustments.

FIGS. 21-23 illustrate another technique for automatically registering user photographs in space. When the feature points in a point cloud are not particularly dense and or may be spread over a fairly large geographic area, the image content may be used to provide additional information for an automatic registration process.

FIG. 21 shows an overhead view of a scene, in actuality, Waimea, Hi. Many of the features visible in the overhead view may not be captured in a 3-D model synthesized from a plurality of photographs of the same area. For example, roads and parking lots are easily found in an overhead view but may not translate to structures for which there are corresponding feature points in a point cloud. FIG. 22 may be representative of a top view point cloud at least a portion of the same scene. In this case, a context of the images may be helpful. Pixels from the photographic images may be analyzed to create a model of the scene to simulate the surfaces that may be visible from above, such as the parking lots and roads. Pixels from the scenes may be extracted and analyzed for color, creating a simulated top view colormap of the scene, as depicted in FIG. 23. Automatic matching may then take place between color information from the top view of the point cloud with the extracted colormap of the scene, using a process the same as or similar to that described above.

The techniques described above are useful for aligning a point cloud in an x-y space, such as two-dimensional longitude and latitude. In some cases, orientation in the z direction may be useful. For example, some point clouds may not have a clear representation of the ground, as may be the case for pictures of a tall building where the camera angle is primarily upwards or when ground clutter obscures the actual bottom of an object.

Figure 24:
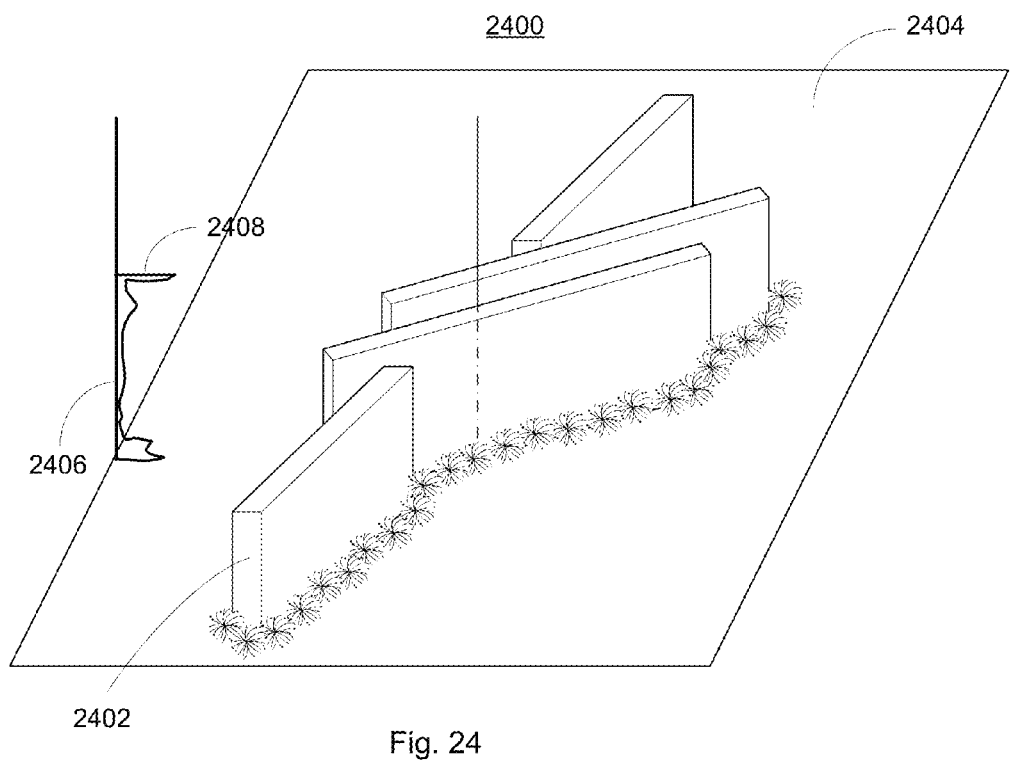
FIG. 24 is a perspective view of an scene.

FIG. 24 illustrates a technique for spatially registering user photographs in the z (or height) direction. A perspective view 2400 of a scene may be captured. The perspective view 2400 may show an object 2402 and a presentation of ground level 2404. The perspective view 2400 may be a photograph taken from a known altitude platform, such as an airplane-based photograph taken at a known altitude. An example of such pictures may be seen in the Bing.com™ maps 'aerial view' photographs.

A vertical projection 2406 of a point cloud associated with the object 2402 can be used to determine a top 2408 of the point cloud, that is, determine the vertical elevation of the point cloud by translating the vertical projection of the point cloud in the vertical direction. Additionally, the 3-D point cloud can be rotated and zoomed to register with the object 2402 in the perspective view 2400. Once registered with the perspective view, and given the projected top 2408, the actual ground height of the point cloud can be calculated using the perspective view and the known altitude of the camera.

Figure 25:
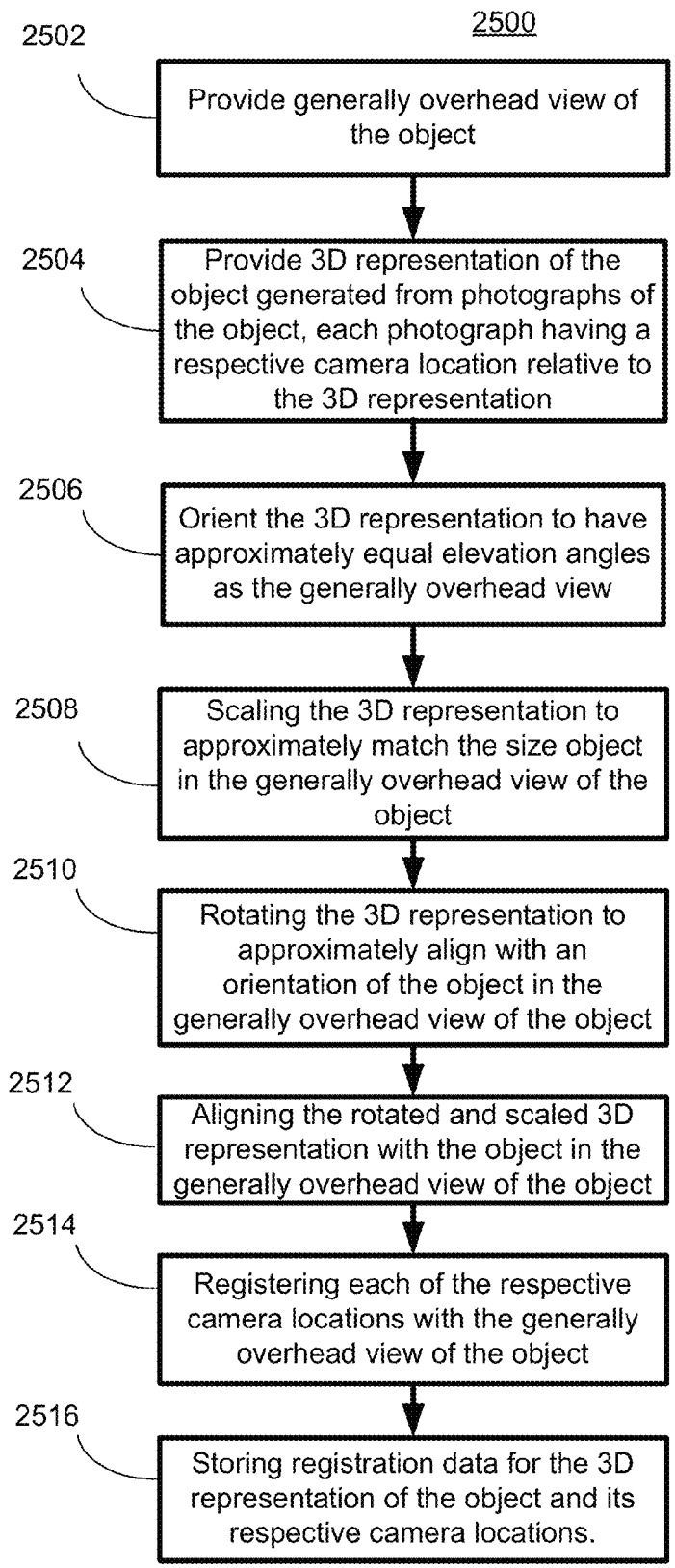
FIG. 25 is a flow chart of a method of spatially registering user photographs.

FIG. 25 may illustrate a method 2500 of aligning a three dimensional (3D) representation of an object with an oriented view of the same object. The object may be a structure or may be a natural feature, such as a mountain, tree, waterfall, etc. The object need not be restricted to outdoor objects, but may be an interior space, a statue, etc., as long as there is a both a 3D representation and an oriented view of the same object. Existing 3D imaging processes, such as an MRI imaging scan of a body, have no need to know the orientation of the body when the images were captured because the 3D image is self-aligned with the body. Whether the MRI machine was facing north or east is not important to the captured image. As described herein, there is a desire to align and register an independently generated 3D representation or model of an object to its actual locale and orientation.

At block 2502, a generally overhead view of the object may be provided. The generally overhead view of the object may be a satellite photograph, an aerial photograph, a map, etc. The generally overhead view of the object, at least outdoor objects, may generally perpendicular to the ground, as in a satellite image, or may be at some perspective angle, as in an aerial photograph, but will in almost all cases show a sky-facing view of the object. The discussion above and following uses photographs for the sake of discussion, but other techniques such as, but not limited to, infrared, LIDAR, RADAR, Ultrasound, and X-rays may also be used. As used for illustration, the generally overhead view of the object, such as a statue or building, may have associated with it a known geographic location and orientation, that is, a latitude and longitude and compass direction. For example, a satellite photograph may always be oriented with true north (0 degrees) at the top.

In some embodiments, providing the generally overhead view of the object may include processing steps to extract edge pixels (edgels) of features depicted in the generally overhead view, as shown in FIG. 15. In some cases, the edgels may be further filtered into sets of edgels at fixed degree orientation views, as shown and described above with respect to FIG. 18.

At block 2504, a 3D representation of the object may be provided. The 3D representation may be a point cloud of individual feature points that are generated, at least in part, from a plurality of photographs of the object, each of the plurality of photographs having a respective calculated camera location relative to the object. In one embodiment the 3D representation of the object is a point cloud made from a set of points in 3D space that collectively make up the 3D representation and represent features on the object, such as edges from a given camera location or individual points, such as an eye of a statue, etc.

At block 2506, the 3D representation may be oriented to have an approximately equal elevation angle as the generally overhead view of the object. For example, if the generally overhead view is a satellite photograph, the 3D representation may be oriented to present a top view. Similarly, if the generally overhead view is a perspective view, as depicted in FIG. 24, the 3D representation may be oriented to the same elevation either automatically or with known user interface techniques.

At block 2508, the 3D representation may be scaled to approximately match the size of the generally overhead view of the object. A perfect match is possible, but not generally necessary. Depending on viewing scale, a match within several pixels on the screen may appear perfect, but in actuality, may represent an error of several feet or even hundreds of yards or more but may still provide the desired registration accuracy.

At block 2510, the 3D representation may be rotated to approximately align with an orientation of the object in the generally overhead view of the object. As above, the alignment may be exact, but may not need to be for the sake of the end task to be accomplished.

In one embodiment, a tool, such as tool 700 of FIG. 7, may be provided for performing the scaling and rotating of the 3D representation, as described above, the tool 700 may have a first control for scaling and a second control for rotating the 3D representation. The 3D representation of the object may be flattened to provide a 2D view of the point cloud perpendicular to the approximately equal elevation angle for placement in the tool viewing area. A contrast region may be generated around each point in the flattened view to provide increased contrast for viewing in the tool. The contrast region may be provided with a decreased opacity at an edge of the blurred region compared to an opacity at a center of the contrast region, as shown in FIG. 6. In an embodiment, the tools background 704 may decrease visibility of the generally overhead view when the tool is active for scaling or rotating to provide increased visibility of the 3D representation when being operated on.

The tool 700 may be fixed in a window and may include moving the generally overhead view of the object while the tool remains centered in a viewing area of the window.

At block 2512, the rotated and scaled 3D representation may be aligned with the object in the generally overhead view of the object in an x-y translation. This may be accomplished by a 'grab and move' motion with a cursor control device or may use direction controls such as movement control 802 in FIG. 8.

Obviously, when performed manually using a tool, the steps of scaling 2508, rotating 2510, and aligning 2512 may be performed in any sequence, or may be performed iteratively between and among the steps to allow the user to determine a best fit using his or her judgment. Automatic matching, for example using the FFT convolution technique, may simply iterate until a pre-determined score is reached, a peak value is determined after a number of iterations, or a change in score between runs is too small.

As described above with respect to FIG. 24, a vertical alignment may also be performed in some embodiments.

At block 2514, after the alignment of the 3D representation and object is achieved in scale, orientation, x-y translation, and optionally, height, a registration of the 3D representation may be made with the actual object. The registration may include attaching geographic coordinates to points in the point cloud of the 3D representation. The registration may also include attaching geographic coordinates to the calculated camera locations for each photograph of the plurality of photographs used to generate the 3D representation. The geographic coordinates may include latitude, longitude, and optionally, elevation. In some embodiments, the calculated camera locations may also be registered relative to the object itself using a two or three dimensional referencing system such as vector angle and distance, and optionally, height above the base of the object or ground level.

At block 2516, the registration data for the 3D representation, camera locations, etc. may be stored on a computer media. The registration data may be used in a number of ways. Camera locations of existing photographs can be used to capture new photographs from the same location for before and after pictures, time-lapse photographs, etc. Registration data allows determination of the time of day or the time of year when the photos were taken by analyzing sun location and shadows. Registration data for actual points of an object can be used to determine movement of the object or for restoration work, when sufficiently detailed data is available.

The ability to create 3D models or point clouds of objects from simple user photographs and then to be able to match those models to actual physical coordinates brings a new level of sophistication to the documentation and preservation of real world places, both natural and man-made. When multiple, individual 3D representations of an object, e.g. point clouds, are made from separate set of photographs and all registered to the actual object, the photographs and camera locations can all be registered to the actual object and not just to photos from the same set. This allows blending of photo sets from multiple contributors creating a much richer viewing experience.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer-implemented method for registering a three-dimensional (3D) representation of an object, the method comprising:
    displaying the 3D representation and a generally overhead view of the object on a computer;
    adjusting the displayed 3D representation to at least approximately match the generally overhead view of the object in scale, orientation, and two-dimensional (2D) translation, wherein adjusting the 3D representation includes orienting the 3D representation to have an approximately equal elevation angle as the generally overhead view of the object; and
    associating a geographic coordinate of the generally overhead view of the object with the adjusted 3D representation, the geographic coordinate including at least one of a location relative to the object, an earth coordinate location of the object, an earth coordinate orientation of the object, or a magnetic coordinate orientation of the object.

2. The method of claim 1 wherein adjusting the displayed 3D representation includes performing at least one of:
    scaling the 3D representation to approximately match a size of the object in the generally overhead view of the object; or
    rotating the 3D representation to approximately match an orientation of the object in the generally overhead view of the object.

3. The method of claim 1 wherein the 3D representation of the object is generated from a plurality of photographs of the object, the photographs being captured from individual camera locations relative to the object, and wherein the method further includes determining the individual camera locations based on the geographic coordinate of the generally overhead view of the object.

4. The method of claim 1 wherein the generally overhead view of the object is generally perpendicular to ground, and wherein displaying the 3D representation includes orienting the 3D representation to present a top view of the 3D representation of the object.

5. The method of claim 1 wherein the generally overhead view of the object is generally perpendicular to ground, and wherein:
    displaying the 3D representation includes orienting the 3D representation to present a top view of the 3D representation of the object; and
    adjusting the 3D representation includes performing at least one of
        scaling the 3D representation to approximately match a size of the object in the generally overhead view of the object, or
        rotating the 3D representation to approximately match an orientation of the object in the generally overhead view of the object.

6. The method of claim 1 wherein the generally overhead view includes a perspective view of the object taken with a camera at an altitude, and wherein adjusting the 3D representation includes translating a vertical projection of the 3D representation to be at an elevation approximately as the perspective view of the object taken from the altitude.

7. The method of claim 1 wherein the generally overhead view of the object has a geographic location and orientation, and wherein associating the geographic coordinate includes associating the geographic location and orientation of the generally overhead view of the object with the 3D representation of the object.

8. The method of claim 1 wherein the generally overhead view of the object has a latitude, a longitude, and a compass direction, and wherein associating the geographic coordinate includes associating the latitude, longitude, and compass direction of the generally overhead view of the object to the 3D representation of the object.

9. The method of claim 1 wherein the generally overhead view includes a perspective view of the object taken with a camera at an altitude, and wherein:
    adjusting the 3D representation includes:
        translating a vertical projection of the 3D representation to be at an elevation approximately as the perspective view of the object taken from the altitude;
        performing at least one of scaling the 3D representation to approximately match a size of the object in the perspective view, or rotating the 3D representation to approximately match an orientation of the object in the perspective view; and
    the method further includes calculating a ground height of the 3D representation based on the altitude of the camera and the perspective view of the object.

10. A computer-implemented method for spatially registering a three-dimensional (3D) representation of an object, the method comprising:
 displaying the 3D representation and a generally overhead view of the object, the generally overhead view being at a perspective angle with ground;
 performing at least one of rotating, scaling, or aligning the displayed 3D representation to
 at least approximately match the displayed generally overhead view such that a vertical projection of the 3D representation is at an elevation having a perspective angle with ground that is approximately equal to the perspective angle of the generally overhead view; and
 associating a geographic coordinate of the generally overhead view of the object to the rotated, scaled, or aligned 3D representation.

11. The method of claim 10 wherein displaying the 3D representation and the generally overhead view of the object includes displaying at least one of a map, an aerial photo, or a satellite photo of the object.

12. The method of claim 10 wherein displaying the 3D representation and the generally overhead view of the object includes displaying a two-dimensional (2D) photograph of the object taken with a camera having a frusta and a camera location relative to the object.

13. The method of claim 10 wherein displaying the 3D representation and the generally overhead view of the object includes displaying a top view of the 3D representation and a two-dimensional (2D) photograph of the object taken with a camera having a frusta and a camera location relative to the object.

14. The method of claim 10 wherein the method further includes calculating a ground height of the 3D representation based on an altitude of a camera used to take the generally overhead view of the object.

15. The method of claim 10 further comprising generating contrast regions for the 3D representation, the contrast regions individually having a lower opacity at an edge than at a center of the contrast regions.

16. The method of claim 10 further comprising decreasing visibility of the generally overhead view when performing at least one of rotating, scaling, or aligning the displayed 3D representation.

17. A computer-storage device containing instructions that cause a processor to perform a method for registering a three-dimensional (3D) representation of an object, the method comprising:
 generating an edge map showing edges of objects based on a two-dimensional (2D) image of the objects, the image having an associated geographic coordinate;
 filtering the generated edge map to generate a filtered edge map having edges extending along generally the same direction;
 determining a best fit of the 3D representation at a particular one of the scales, rotations, and 2D translations based on the filtered edge map of the 2D image; and
 associating the geographic coordinate of the 2D image to the determined best fit of the 3D representation.

18. The computer-storage device of claim 16 wherein the 3D representation includes a plurality of feature points, and wherein determining the best fit includes generating a weighted score for the individual feature points at a plurality of scales, rotations, and 2D translations, and determining a best fit of the 3D representation at a particular one of the scales, rotations, and 2D translations based on the weighted scores.

19. The computer-storage device of claim 16 wherein filtering the generated edge map includes:
 defining edge pixels of objects in the generated edge map; and
 removing edge pixels of objects not lying along a particular direction.

20. The computer-storage device of claim 16 wherein the 3D representation includes a plurality of feature points, and wherein:
 filtering the generated edge map includes:
  defining edge pixels of objects in the generated edge map; and
  removing edge pixels of objects not lying along a particular direction determining the best fit includes:
  creating a distance map for the filtered edge map by computing for each pixel a distance to closest edge pixels in the filtered edge map;
  computing a convolution of the distance map for edge pixels from the 2D image with the corresponding feature points of the 3D representation to generate a weighted score; and
  iterating the convolution at a plurality of scales, rotations, and 2D translations to determine the best fit of the 3D representation with the 2D image.

21. A computer-implemented method for registering a three-dimensional (3D) representation of an object, the method comprising:
 displaying the 3D representation and a generally overhead view of the object on a computer;
 generating contrast regions for the 3D representation displayed on the computer, the contrast regions individually having a lower opacity at an edge than at a center of the contrast regions;
 performing at least one of rotating, scaling, or aligning the displayed 3D representation to at least approximately match the displayed generally overhead view of the object; and
 associating a geographic coordinate of the generally overhead view of the object to the rotated, scaled, or aligned 3D representation.

22. The method of claim 21 wherein displaying the 3D representation and the generally overhead view of the object includes displaying at least one of a map, an aerial photo, or a satellite photo of the object.

23. The method of claim 21 wherein displaying the 3D representation and the generally overhead view of the object includes displaying a two-dimensional (2D) photograph of the object taken with a camera having a frusta and a camera location relative to the object.

24. The method of claim 21 wherein displaying the 3D representation and the generally overhead view of the object includes displaying a top view of the 3D representation and a two-dimensional (2D) photograph of the object taken with a camera having a frusta and a camera location relative to the object.

25. The method of claim 21 wherein a vertical projection of the 3D representation is at an elevation approximately as a perspective view of the object, and wherein the method further includes calculating a ground height of the 3D representation based on an altitude of a camera used to take the generally overhead view of the object.

26. The method of claim 21 further comprising decreasing visibility of the generally overhead view when performing at least one of rotating, scaling, or aligning the displayed 3D representation.

* * * * *